United States Patent Office

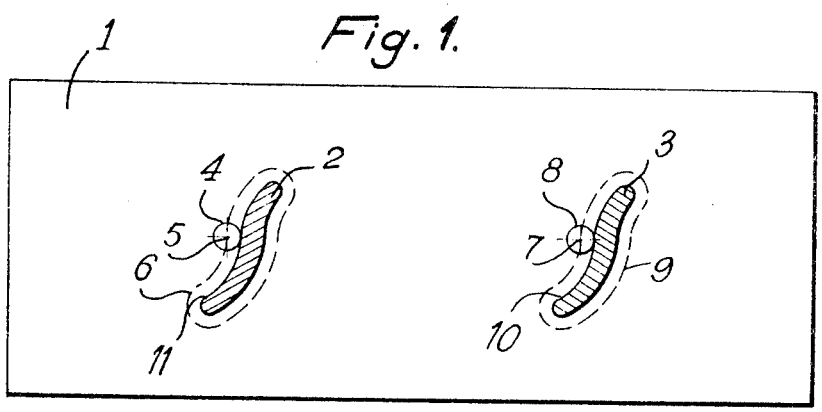
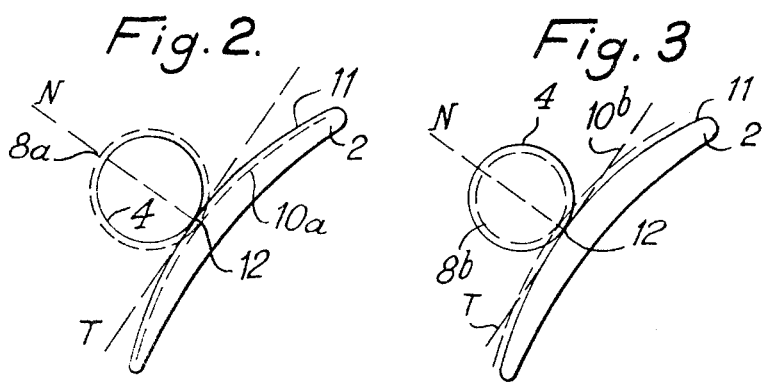
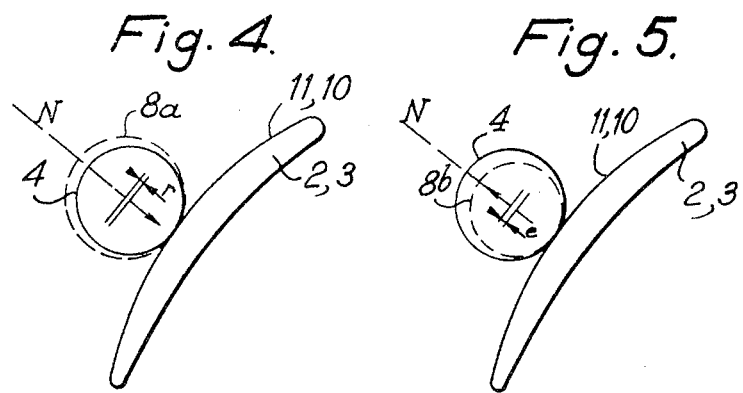

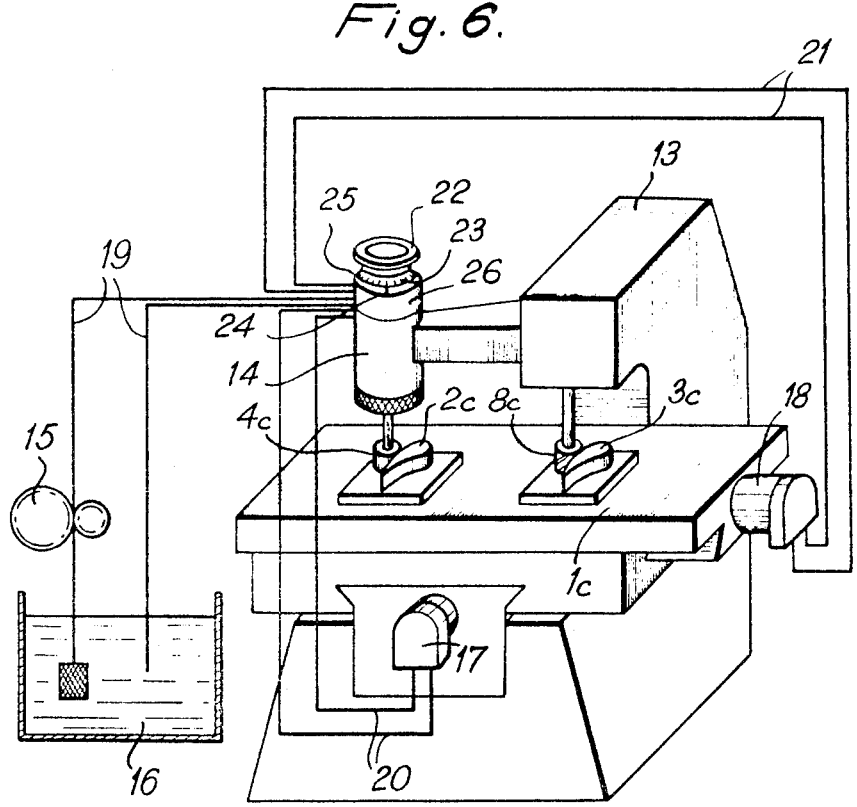

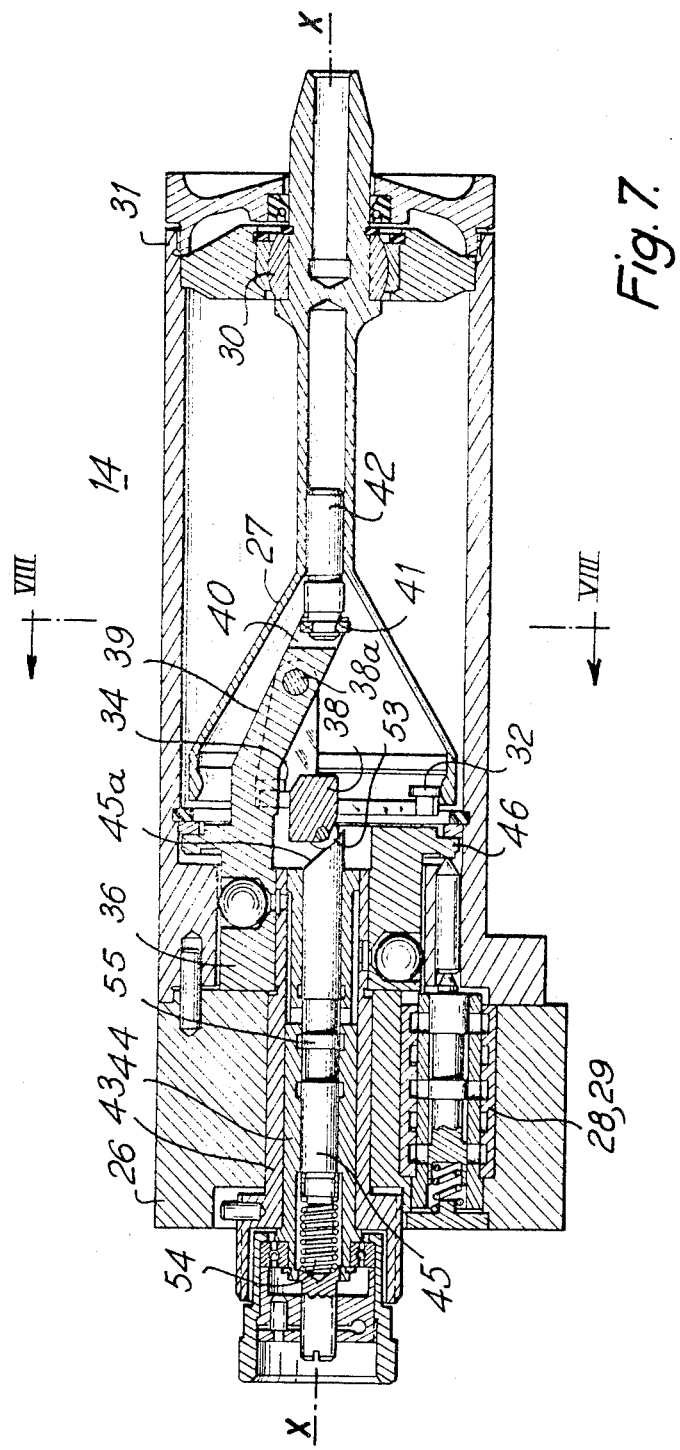

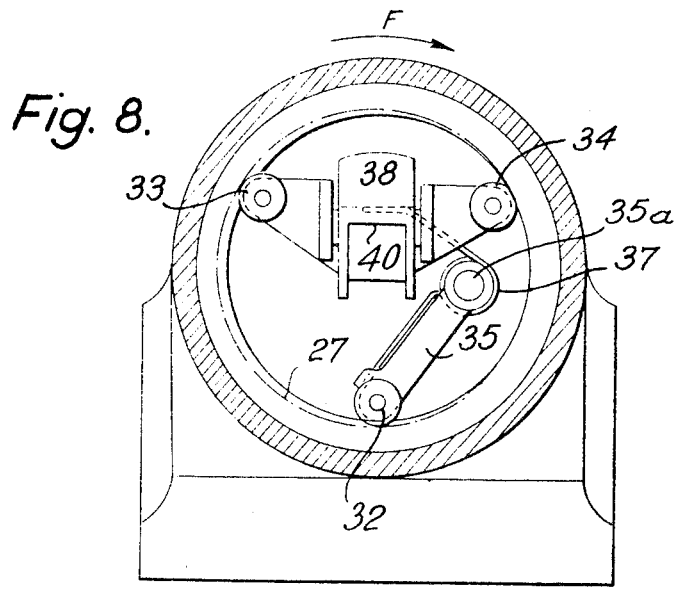
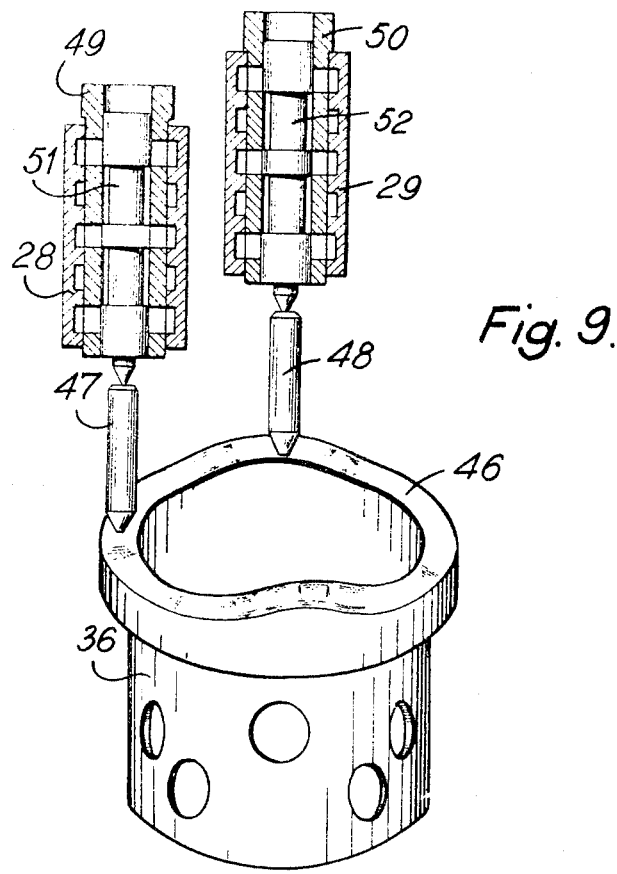

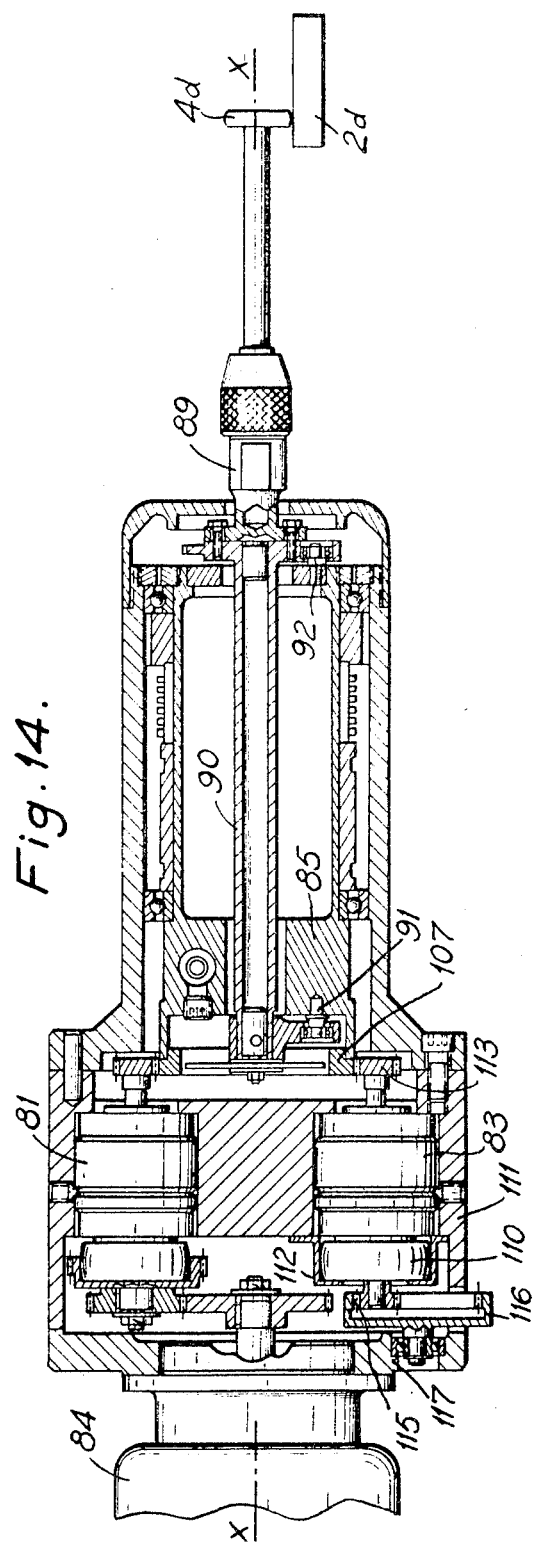

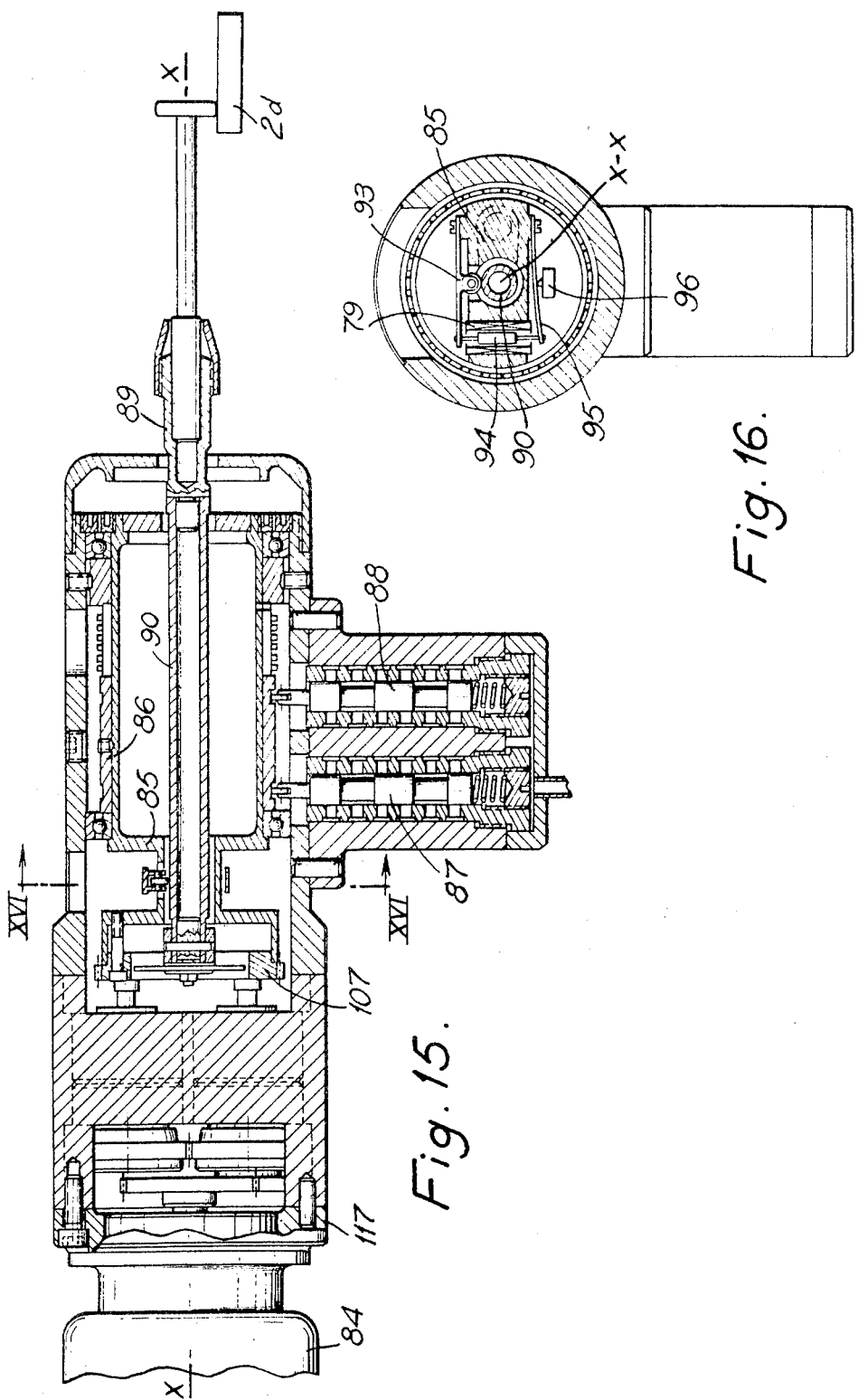

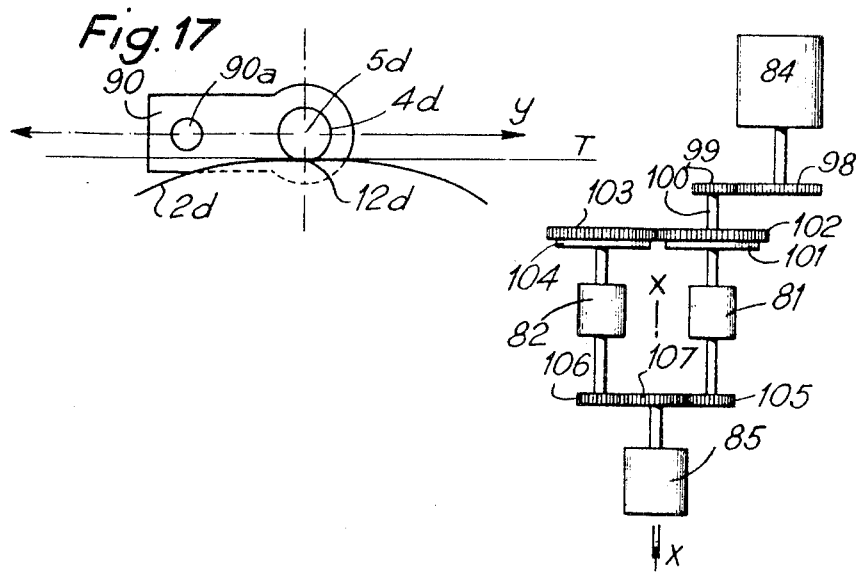
Fig. 17
Fig. 19.
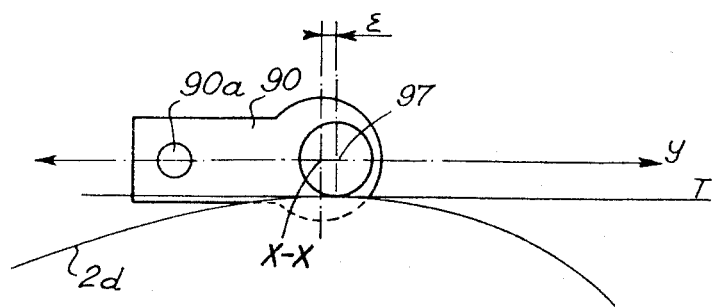
Fig. 18
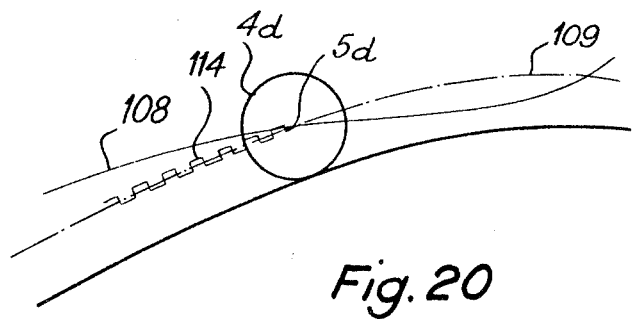
Fig. 20

3,273,462
Patented Sept. 20, 1966

3,273,462
360-DEGREE COPYING METHOD AND APPARATUS
Alfred H. Cheringou and Jean L. G. Heugas, Basses-Pyrenees, France, assignors to Turbomeca, Bordes, Basses-Pyrenees, France
Filed Oct. 21, 1964, Ser. No. 405,511
Claims priority, application France, Oct. 29, 1963, 952,084, Patent 1,384,664
25 Claims. (Cl. 90—13.5)

Automatic continuous copying over 360 degrees (hereinafter referred to as "360-degree copying") permits reproduction by copying of a part over which the copying-head follower rides.

Presently known commercially available 360-degree copying devices, be they hydraulically or electrically controlled, are so designed that it is absolutely imperative, if the machined part is to have the same dimensions as the pattern, that the copying head follower and the cutting tool have strictly the same diameter, or be suitably concerted to suit the design of the pattern.

This vital requirement is not a major drawback when machining is effected with an end milling cutter since sharpening such a milling tool will not affect its diameter. Conversely, when the machining is performed by the generators or the lateral surface of the tool, the ensuing wear on the tool and sharpening the latter both tend to reduce its diameter; hence if the same follower is retained, the dimensions of the machined part will differ from those of the pattern by an amount equal to the difference in tool radius. It is therefore necessary, whenever the diameter of the tool is reduced through wear or sharpening, to utilize a new follower of diameter matched to that of the tool. Having regard for the precision customarily required in copy machining, this makes it necessary for the operative in classic 360-degree copying to have available a range of followers the diameters of which decrease, in principle, in 0.10 millimetre steps.

Moreover, it is impossible to look upon the use, with known copying heads, of a grinding wheel as the cutting tool because of the large continuous variations in its diameter as machining proceeds. This latter consideration consequently rules out copy grinding even when the latter is technically indispensable.

It is the main object of the present invention to overcome these various drawbacks and to accordingly provide a 360-degree copying method involving the use of a single follower in contacting engagement with a pattern to be reproduced with cutting tools the diameter of which may differ from that of said follower within limits of plus or minus 2 millimetres approximately, said method consisting in displacing the centre of the follower, relatively to its theoretical position wherefor the diameter of said follower is equal to that of the cutting tool, in a direction perpendicular to the tangent to the profile of the pattern at the corresponding theoretical copying point, toward or away from said point according as the tool is larger or smaller, respectively, than said follower, and in limiting this displacement to an amount equal to half the difference between the actual diameters of said follower and of said cutting tool.

In accordance with this invention, in cases where 360-degree copying is effected on a miller with a movable platen, said displacement and limitation thereof are referenced to the mutual positions of the follower and the pattern, and movement of the miller platen is referenced to the actual position of the follower centre in relation to its theoretical position.

The method hereinbefore specified offers the following advantages in comparison with conventional 360-degree copying methods:

(a) The same tool/follower combination can be used for roughing and finishing operations by calibrating the size.
(b) Great ease of operation.
(c) The copying head can be mounted on any standard milling machine in the same way as any other accessory.
(d) A grinding wheel can be used while making allowance for the wear it sustains in operation.
(e) Small size.
(f) Robustness and ease of manufacture.
(g) Low cost.

The invention has for further object a copying head adaptable to a milling machine having a mobile platen for performing the method set forth hereinabove, characterized in that it comprises a follower-holder supported on means for modifying the position of the follower centre relatively to its theoretical position, a first servo-control chain for servo-controlling said means to the mutual positions of the follower and the pattern mounted on the milling machine platen, a second servo-control chain for servo-controlling the movements of said platen by the actual position of the follower centre with respect to its theoretical position, and means for compensating for differences in diameter between said follower and the cutting tool in the case of tools the diameters of which differ from that of said follower by up to approximately 2 millimetres.

This copying head permits hydraulic or electric copying, all movement of the milling machine platen being controlled hydraulically, preferably through the agency of motors, symmetrical actuators, or differential actuators well known per se.

The description which follows with reference to the accompanying non-limitative exemplary drawings will give a clear understanding of how the invention can be carried into practice.

In the drawings:

FIG. 1 illustrates the general principle of 360-degree copying;

FIGS. 2 and 3 show the profile variations with respect to the pattern that would be obtained with cutting tools larger and smaller respectively than the follower;

FIGS. 4 and 5 illustrate the principle of compensation for the differences in diameter between the follower and the cutting tool, for tools larger and smaller respectively than the follower;

FIG. 6 is a schematic view of a conventional miller equipped with a hydraulic copying head according to the invention;

FIG. 7 shows in diametrical section a hydraulic copying head according to the invention, devoid of means for compensating differences in diameter between the follower and the tool;

FIG. 8 is a sectional view on a enlarged scale through the line VIII—VIII of FIG. 7, the follower-holder having been removed;

FIG. 9 shows in perspective on an enlarged scale the rotor of the hydraulic motor of the copying head of FIG. 7 and the fluid distributing slide-valves for the mobile platen of the miller, said slide-valves being shown in diametrical section;

Figure 10:
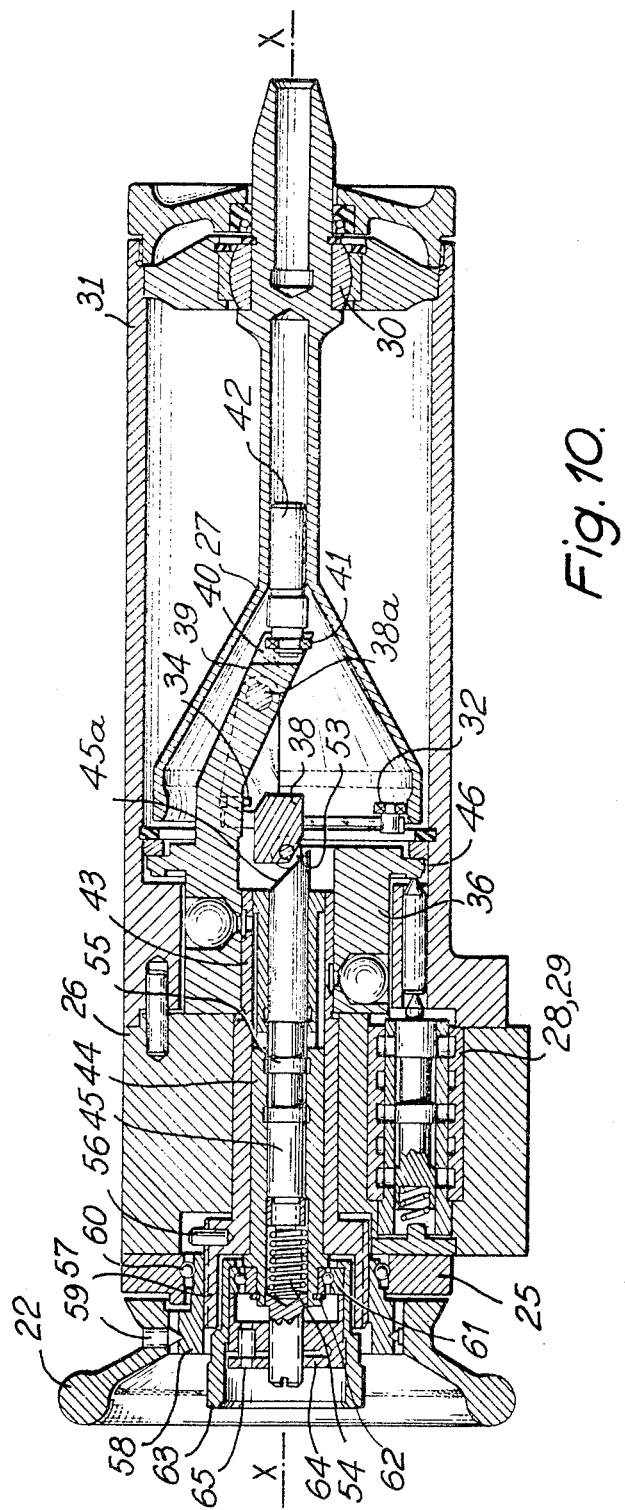
FIG. 10 is a view corresponding to that of FIG. 7, the copying head being equipped with means for compensating for differences in diameter between the follower and the tool.
Figure 11:
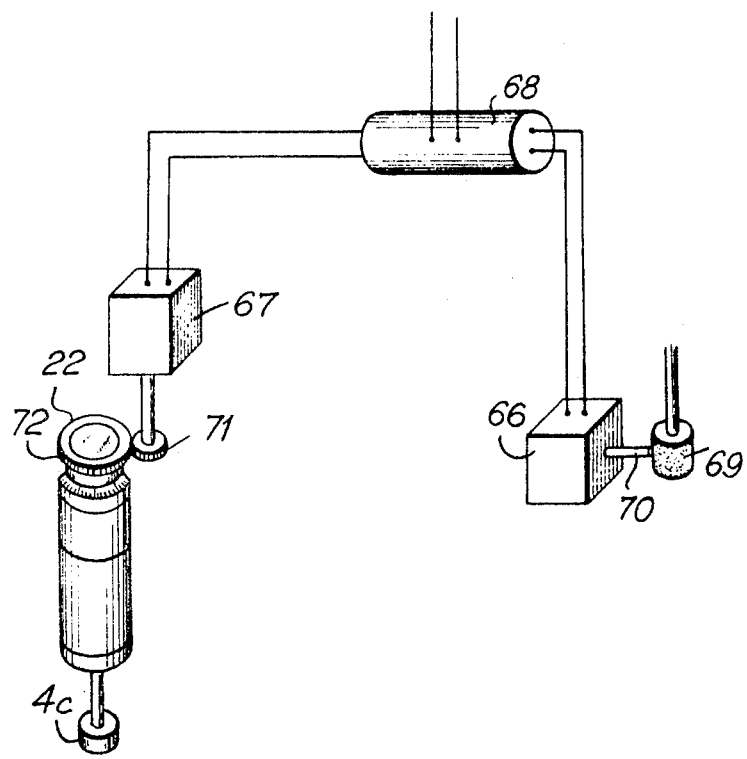
Figure 12:
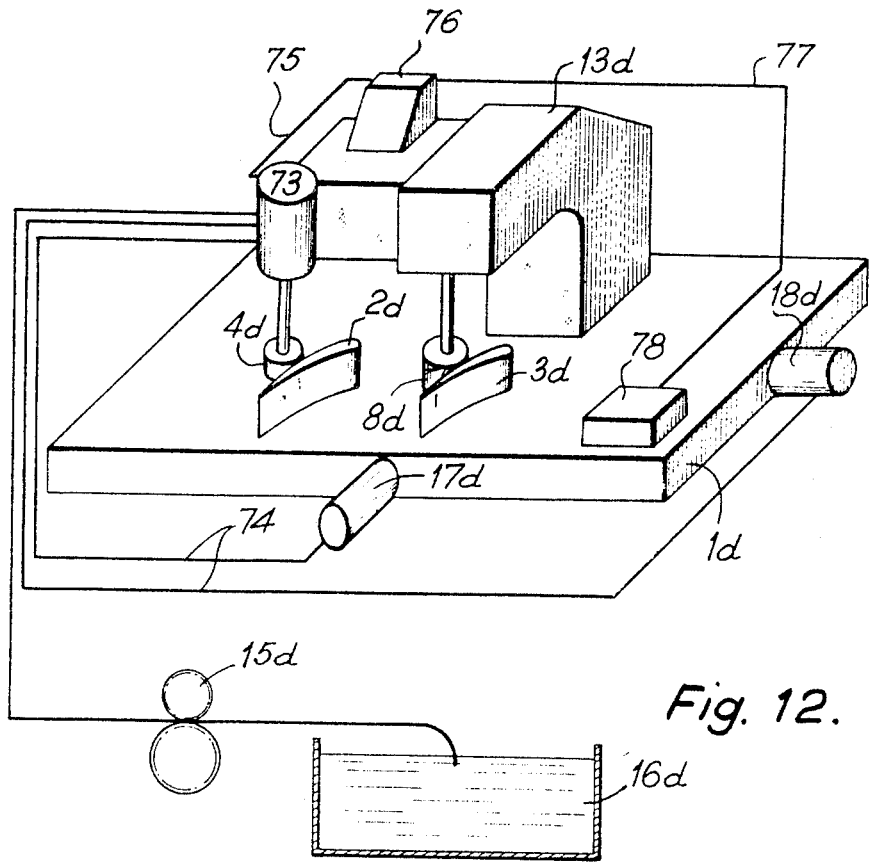
Figure 13:
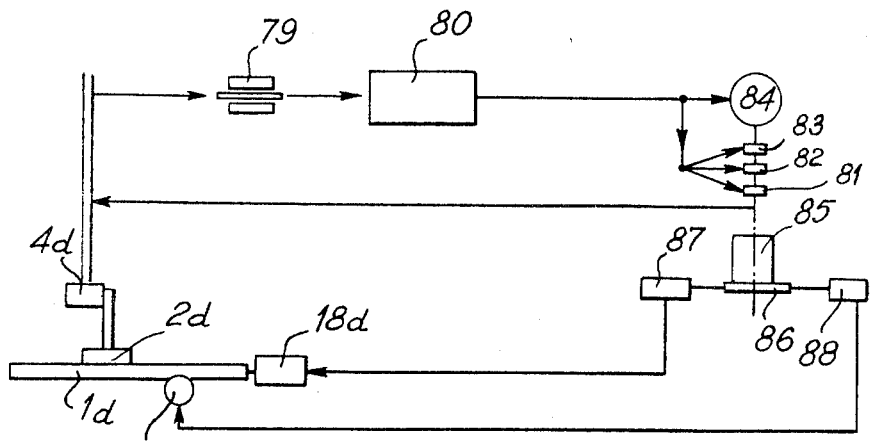
Figure 21:
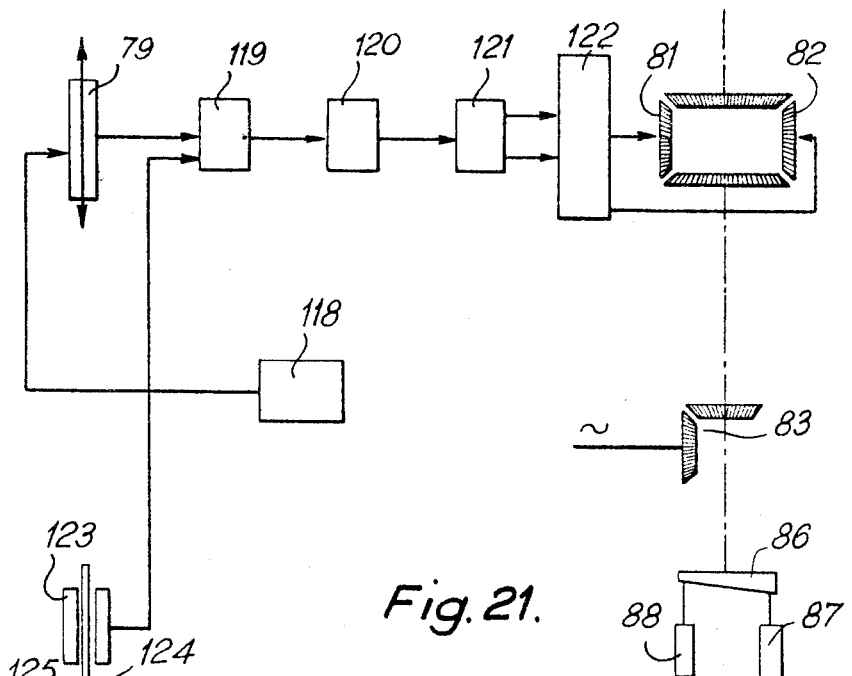
Figure 22:
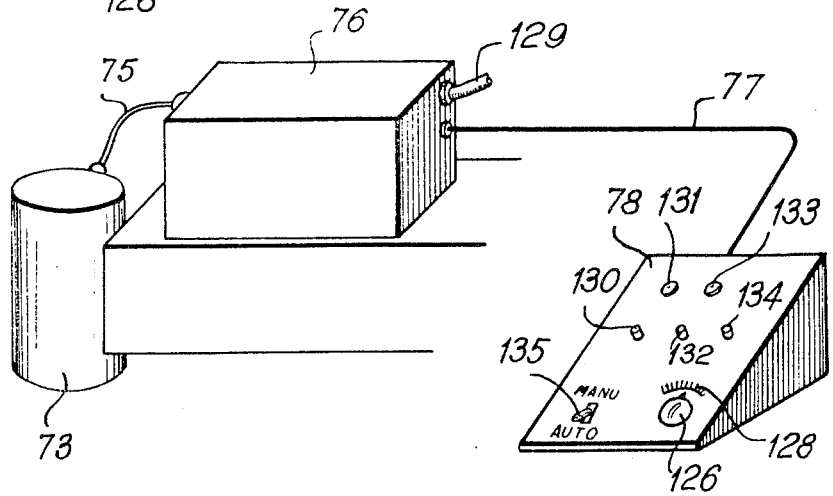

FIG. 11 schematically illustrates an automatic tool wear compensating system for use with the copying head of FIG. 10, more particularly for cases where the cutting tool is a grinding wheel;

FIG. 12 shows schematically a conventional miller equipped with an electrically controlled copying head according to the invention;

FIG. 13 is a functional block diagram for an electrically controlled copying head according to the invention;

FIGS. 14 and 15 are diametrical sectional views, through planes at right angles to each other, of an electrical copying head according to the invention;

FIG. 16 is a section taken through the line XVI—XVI of FIG. 15;

FIG. 17 schematically illustrates the theoretical positions of the follower and the lever supporting the same with respect to the pattern;

FIG. 18 schematically illustrates the true position which the follower must occupy in relation to its theoretical position, allowing for its phase lead;

FIG. 19 shows in diagrammatic form the driving motor for the rotor of the electrical copying head on FIGS. 14 and 15 and the transmission system between said motor and said rotor;

FIG. 20 shows on an enlarged scale the roughnesses in the copied contour engendered by the time constants and the electrical remanence of the rotor driving members, and the profile as corrected with the aid of means included in the copying head of FIGS. 14 and 15 for eliminating the surge effect due to said time constants and remanence;

FIG. 21 is a block diagram of the electronic control means for operating the electrical copying head of FIGS. 14 and 15, showing the device for compensating for differences in diameter between the follower and the tool; and Fig. 22 illustrates diagrammatically the electronic equipment in general and the control console in particular for an electric copying head according to the invention.

As is well known, and as shown in FIG. 1, the underlying principle of 360-degree copying consists in controlling through a copying head the movements of a miller platen 1 supporting the pattern 2 and the part or blank 3 to be machined in such manner that the follower or feeler 4, which is stationary in space, remains in permanent contact with the pattern 2 or, what amounts to the same thing, that the centre 5 of the follower 4 remains in continuous contact with a profile 6 parallel with that of the pattern 2 and follows the full 360-degree perimeter thereof at a distance from the pattern equal to the radius of the follower. Under such conditions, the centre 7 of the cutting tool 8, which machines the part 3 by its lateral surface and the position in space of which remains fixed in relation to that of the follower 4, will describe a path 9 round the part to be machined that can be exactly superimposed upon the path 6 described by the follower centre 5, whereby, since the diameters of the follower 4 and the tool 8 are equal, the profile 10 of the machined part will be identical to the profile 11 of the pattern 2.

In cases where the tool diameter is not equal to that of the follower 4, the machined profile will differ from the profile 11 of the pattern 2, as shown by the broken lines in FIGS. 2 and 3; it will be inscribed (see profile 10a in FIG. 2) if the tool 8a is larger than the follower, or circumscribed (see profile 10b in FIG. 3) if the tool 8b is smaller than the follower.

In accordance with the present invention, in order to obtain a machined part 3 of equal size to the pattern 2 the centre 5 of the follower 4 is shifted or displaced with respect to its original position corresponding to equal follower and tool diameters, in a direction N perpendicular to the tangent T to the profile at the original or theoretical copying point 12, by an amount equal to half the difference between the diameters of the tool 8a (or 8b) and the follower 4. When the tool 8a is larger than the follower, the shift r is a displacement of the follower toward the original copying point (see FIG. 4), whereas when a tool 8b is smaller than the follower the shift e is a displacement away from said point (see FIG. 5).

In these new configurations, the miller platen 1 keeps the pattern 2 in contact with the follower 4, whilst, since the position of the centre 7 of the tool 8a or 8b has not been altered, the blank 3 will be moved away from (FIG. 4) or toward (FIG. 5) said centre by a distance equal to the shift r or e of the follower 4. This produces a workpiece 3 identical to the pattern 2.

In accordance with the present invention, the displacement of the follower is obtained through the agency of a hydraulically controlled (FIGS. 6 through 11) or electrically controlled (FIGS. 12 through 22) copying head.

In the form of embodiment shown in FIG. 6, the platen 1c of a conventional milling machine or miller supports the pattern 2c and the workpiece or blank 3c. The head 13 of the miller carries the tool 8c and the hydraulically controlled copying head 14, the follower 4c of which rides over the pattern 2c. The copying head 14 is supplied with pressure oil by a pump 15 which draws the oil from a tank 16 into which discharge the return flows from the copying head 14 and the motors or actuators 17 and 18 controlling the miller platen 1c. Piping systems 19, 20 and 21 respectively connect the copying head 14 to the pump 15 and the tank 16, and the motors or actuators 17 and 18 to the copying head 14.

The copying head 14 comprises a handwheel 22 on which is engraved a set of graduations 23 each division of which corresponds to one-tenth of a millimetre of difference between the diameters of the tool and the follower. When the operative rotates the handwheel 22 this set of graduations, which extends from −2 mm. to +2 mm., moves past a mark 24 on the cap 25 of the copying head casing 26.

Internally, as shown in FIGS. 7, 8 and 9, the hydraulically controlled copying head 14 contains a follower-holder 27, a hydraulic motor and two distributing slide-valves 28 and 29. The follower-holder 27 is mounted in a ball-joint 30 rigidly connected to the body 31 of the copying head. The end of the follower-holder 27 remote from the follower 4c is held in position relative to the copying head axis X—X by three ball bearings 32, 33 and 34 (see FIG. 8). The bearing 32 is mounted on the end of a pivotal lever 35 the pivot 35a of which is rigid with the rotor 36 of the hydraulic motor. A spring 37 continuously urges the bearing 32 against the inner wall of the follower-holder 27, and this wall is represented in dot-dash lines in FIG. 8. The two bearings 33 and 34 are mounted on a pusher 38 which is pivotally connected to an arm 39 of the rotor 36 by means of a pin 38a set at right angles to the copying head axis X—X. The end of the arm 39 has formed thereon a slideway 40 having its centerplane perpendicular to the pin 38a and within which is movable a ball bearing 41 mounted on the end of a shaft 42 driven into the bore of the follower-holder 27, whereby the latter is allowed to tilt relative to the copying head axis X—X only in the diametrical centerplane of the slideway 40, i.e. only in a direction perpendicular to the tangent to the profile to be copied passing through the copying point.

The hydraulic motor is a conventional ball-type motor with an elliptical cage. Its rotor 36 rotates on a bushing 43 which is angularly rigid with, but translatable relative to, the casing 26. Said bushing accommodates a cylinder 44 through which is displaceable a distributing slide 45 having a 45-degree beveled end 45a and the position of which governs motor starting in one direction or the other, or stopping thereof. The rotor 36 of the hydraulic motor bears a cam 46 (see FIG. 9) which, through two pushers 47 and 48, positions, in their respective liners 49 and 50, the slides 51 and 52 of slide-valves 28 and 29. Through the agency of means well known per se said slide-valves initiate rotation in one direction or the other of the motors or actuators 17 and 18 controlling movement of the miller platen 1c. The position of slide 45 within the cylinder 44 is governed by the position of the pusher 38, which pusher is fitted with ball bearings 53 against which the bevel 45a of slide 45 is urged by a spring 54.

The system hereinbefore described functions in the following manner:

It will first be assumed that the follower 4c and the tool 8c have equal diameters. Since the position of pusher 38 within the copying head is determined by the inclination of follower-holder 27 (against the inside of which bearings 32, 33 and 34 are in constant pressure contact) relative to the head axis X—X, it follows that (a) if no force is applied against the follower 4c, the slide 45 will be thrust downwardly by its spring 54; the pusher 38 will offset the follower-holder 27 and the hydraulic motor will rotate in the direction of the arrow F; the centre of follower 4c will then described a circle about its theoretical position through which the vertical axis X—X of the copying head passes; rotation of the cam 46 rigid with the rotor 36 causes a reciprocating motion of the slides 51 and 52, which initiate rotation in alternate directions of the motors or actuators 17 and 18, whereby the miller platen is caused to oscillate imperceptibily about its original position;

(b) when the follower 4c comes into contact with the pattern 2c its centre lies in its theoretical position on the vertical axis X—X of the copying head, thereby returning the slide 45 to its neutral position; the hydraulic motor stops in a position such that through the medium of its cam 46 the slides 51 and 52, operating through the agency of the motors or actuators 17 and 18, cause an instantaneous displacement of the miller platen 1c in the copying direction at uniform speed, along a path parallel to the tangent T to the profile to be copied passing through the contact point of the follower 4c with the pattern 2c; the tool 8c will then machine on the blank 3c a profile that can be exactly superimposed upon the pattern profile;

(c) if, due to the movements of the miller platen, the follower 4c should tend either to move away from the pattern 2c or to dig into it, its centre will deviate from its theoretical position in response to the action of the spring 54 in the former case, or in response to the action of the pattern on the follower in the latter case; the follower axis is consequently tilted, thereby tilting in turn the follower-holder 27 and displacing the bearing 32, 33 and 34, which in turn causes a displacement of the pusher 38; the resulting movement of the slide-valve 45 causes the rotor 36 of the hydraulic motor to rotate by an amount such that the slides 51 and 52 produce changes in the speeds or directions of rotation of the motors or actuators 17 and 18 of the miller platen 1c whereby to return the centre of the follower 4c to its theoretical position on the axis X—X.

In point of fact the component parts of the copying head are servo-controlled by the mutual positions of the follower 4c and the pattern 2c, while the movements of the miller platen are servo-controlled by the position of the follower centre in relation to its theoretical position of alignment upon the copying head axis X—X.

In practice, due to a certain time constant or to the inertia, albeit very small, of the various copying head slide-valves and of the slide 45 in particular, the profile of the machined part will not coincide with that of the pattern but will just circumsribe it, in like manner to a sinusoid. In order to overcome this drawback, a very slight leak flow between the collar 55 of slide 45 and its cylinder 44 imparts to said slide 45 a vibratory motion of high frequency and of a few microns' amplitude, which in turn results in vibration of the rotor 36 and ultimately so decreases the amplitude of the sinusoid constituting the profile of the machined part as to make said profile geometrically superimposable upon the pattern profile. Similarly, in order to ensure proper servo-control and good stability, it is necessary as is well known that the centre of the follower 4c be very slightly offset ahead of its theoretical position along the copying path. This geometrical precession is obtained by construction by very slightly offsetting the centerplane of the slideway 40 in relation to the copying head axis X—X.

In all the foregoing, in order that the finished part be of the same size as the pattern, it was assumed that the follower 4c and the tool 8c, the centres of which follow superimposable paths, were of the same diameter. When this is not so the centre of the follower 4c must be shifted in one direction or the other by an amount equal to half the difference between the diameters, as explained precedingly. In order to allow this shift, the hydraulically controlled copying head according to the invention is devised as shown in FIG. 10.

As previously indicated, the slide-valve 45 terminates in a 45-degree bevel 45a against which bear the ball bearings 53 of pusher 38, so that any movement of the slide-valve 45 longitudinally of itself causes the pusher 38 to be displaced by an equal amount in a direction perpendicular to the copying head axis X—X contained in the centerplane of the slideway 40. By construction, the distance of the contact point of ball bearings 53 with the bevel 45a of slide 45 from the axis of the ball-joint 30 being equal to the distance of the axis of ball-joint 30 from the centre of the follower 4c, any movement of slide 45 longitudinally of itself produces a displacement of equal amplitude of the centre of the follower 4c along the centerplane of the slideway 40. One of the ends of the bushing 43, which is restrained in the casing 26 by a dowel pin 56 slidable along a groove in the casing, has formed thereon a screw-thread 57 with which engages a nut 58 rigidly connected to the handwheel 22 by means of point-screws 59 and suitable serrations. Balls 60 are positioned between the nut 58 and the cap 25 within which the nut rotates. The cylinder 44 is a force fit in the bushing 43 and once in position is rigidly united therewith. The end of the cylinder 44 is equipped with a ball bearing 61 retained in position by a circlip 62 over which is rotatable a milled knob 63. One of the ends of the spring 54 is screwed onto the slide 45 and its other end screwed into a split nut 64 which is in turn screwed into the tapped bore of milled knob 63. Once the unit has been assembled and adjusted, a screw 65 spreads the split of the nut 64 and restrains the latter in the knob 63, as well as the threaded extension of the spring 54 in said nut 64. The mechanism hereinbefore described operates in the following manner:

When the operative rotates the handwheel 22, the assembly comprising the cylinder 44, the bushing 43 and the slide 45 is displaced relative to the rotor 36 of the hydraulic motor along the copying head axis X—X, yet without modifying the orders given to the hydraulic motor. The effect of this is to offset the follower by an amount equal to the shift sustained by the slide 45. In addition, this mechanism enables the follower to be moved nearer to the pattern by manually immobilizing the milled knob 63, and hence the rotor 36 of the hydraulic motor, in a suitable position.

Thus, if, for example, the diameter of the tool is smaller than that of the follower by 0.4 millimeter, all that is necessary in order to ensure that machined part 3c be of the same size as the pattern 2c is to position the —0.2 mark of the set of graduations 23 of handwheel 22 opposite the mark 24, this being the graduation mark corresponding to half the difference between the diameters of the component parts of the copying compound. Similarly, if it is desired to effect a roughing pass at +0.6 millimeter of final size, it will suffice to place the +0.3 mark on the set of graduations 23 opposite the mark 24, in the case of 360-degree copying.

If, in order to obtain a perfect finish, it is desired to use a grinding wheel as the cutting tool, then allowance must be made for the wear on the wheel during machining, and it is accordingly necessary either to determine the wear on the grinding wheel by measurement, preferably in continuous fashion, with the corresponding correction automatically set up on the handwheel 22, or else to grind down the wheel by a predetermined amount and automatically set up the corresponding correction on the handwheel 22.

As is shown in FIG. 11, either of these methods can readily be performed in practice by means of electric or electronic devices 66 and 67, well known per se, connected to an integrator 68 which records variations in the diameter of the wheel 69, as measured by the device 66 through a radial sensor 70, and transmits the corresponding commands to the device 67 which then initiates rotation of the handwheel 22 in the appropriate direction and by the required amount, via a gear train 71, 72.

It goes without saying that an identical automatic process can be put into application in the case of a cutting tool such as a side cutting miller.

In the second form of embodiment of the copying head shown in FIG. 12, the milling head is equipped with a tool 8d and an electrically controlled copying head 73 the follower 4d of which bears against the pattern 2d. The copying head 73 is connected, on the one hand, through a piping system 74 to a pump 15d which draws oil from a tank 16d, and to hydraulic motors or actuators 17d and 18d for actuating the miller platen 1d, and, on the other hand, through an electrical cluster 75 to a control box 76 which is in turn connected through wiring 77 to a control desk 78. The blank 3d is fixed to the miller platen 1d. The general underlying principle of the copying process performed with the electrically controlled head is strictly identical to that set forth hereinabove with reference to FIGS. 1 through 5.

As the block diagram in FIG. 13 clearly shows, the system for controlling the movements of the miller platen 1d through the electrically controlled copying head 73 according to the invention operates in the following manner. The movements of the centre of the follower 4d with respect to its theoretical position affect a differential transformer 79 which applies signals to an electronic device 80 which in turn converts them into commands given to magnetic powder-type couplers 81, 82 and 83, well known per se, which cause electric motor 84 to be coupled to or uncoupled from the rotor 85. Said rotor is equipped with a cam 86 which, through conventional slide-valves 87 and 88, controls movement of the miller platen 1d, whereby the pattern 2d is maintained in pressure contact with the follower 4d. The slide-valves 87 and 88 are enclosed in a removable unit screwed onto the body on the copying head. The slide-valves referred to will differ according as the miller platen is equipped with symmetrical or differential actuators or with hydraulic motors for controlling its movements. The principle of using screws to secure the slide-valve unit permits ready adaptation of the appropriate unit to any given milling machine.

As is likewise the case with the hydraulic copying head referred to precedingly, this system involves the superimposition of two servo-control chains, of which one servo-controls the copying head components by the mutual positions of the follower and the pattern, and the other servo-controls the movements of the miller platen by the position of the internal components of the copying head.

The design and manner of operation of the mechanical means for maintaining the follower 4d in contact with the pattern 2d are as follows (see FIGS. 14 through 17). The follower 4d is supported in a follower-holder 89 which is in turn fixed to a swing-bar 90 pivotally connected to two pins 91 and 92 rigid with the rotor 85. A spring 93 which has one end fixed to the rotor 85 biases the swing-bar 90 away from the vertical axis X—X of the copying head (FIG. 16). The core 94 of differential transformer 79 is restrained between the free end of spring 93 and the end of a second spring 95 mounted in opposition to the first spring, in such manner that the angular motions of the core 94 relative to the centre of its coil rigid with the rotor 85 be equal to those of the swing-bar 90 relative to the centre of said rotor 85.

In the copying position, the follower 4d is maintained in contact with the pattern 2d by the spring 95 and its axis is aligned with the axis X—X of the rotor 85 and the copying head. This being so (FIG. 17), the straight line Y joining the projection onto the horizontal plane of the pivoting centre 90a of swing-bar 90 to the centre of the follower 4d will be parallel with the tangent T to the profile to be copied at the contact point 12d of the follower 4d with the pattern 2d.

If, as the result of the displacement commands imparted to the miller platen through the position of rotor 85, the pattern 2d should tend to move away from the follower 4d, the spring 93 will maintain these two parts in contact by pivoting the swing-bar 90 about its pins 91, 92, thereby causing the core 94 of differential transformer 79 to move and to transmit commands, whereby the rotor 85 positions itself so that the straight line Y be parallel anew with the tangent T to the profile at the copying point 12d.

Conversely, if the pressure it exerts causes the pattern to displace the follower from its theoretical position, the swing-bar 90 will operate through the spring 93 to rotate the differential transformer core 94 inside its coil whereby to order the rotor 85 to so position itself that the straight line Y be tangential once more to the profile to be copied.

In either case, the fresh position assumed by the rotor 85 modifies the position of the cam 86 and hence those of the slide-valves 87 and 88 in such manner that motion of the miller platen 1d invariably take place in a direction parallel to the tangent T to the profile at the copying point 12d.

A microswitch 96 (see FIG. 16) controlled by the spring 95 cuts out the differential transformer circuits when, in response to the spring 93, the swing-bar 90 occupies it farthermost position from the copying head axis X—X, as would be the case if no action were to be exerted on the follower 4d.

If, when in the copying position, as explained precedingly, the centre 5d of follower 4d is to lie thoretically on the vertical axis X—X of the copying head, then it will be necessary in practice, in order to ensure correct servo-control and excellent stability, that the follower centre 5d be slightly offset ahead of its theoretical position whilst continuing to be projected onto the straight line Y, the amount of offset varying directly with the copying rate selected and the stability sought. In practice this geometrical precession is achieved by offsetting the follower-holder 89 within the bore of swing-bar 90 by a very small quantity $\epsilon$ with respect to the center 97 of the follower holder 89 (see FIG. 18). By merely replacing the follower-holder 89 it is possible to select the value of this geometrical precession as a function of the desired copying rate and stability.

As FIG. 19 clearly shows, rotation of the rotor 85 at the desired instant, in the appropriate direction and by the appropriate amount, is controlled by the electric motor 84 which constantly rotates at uniform speed in the same direction.

The shaft of electric motor 84 supports a pinion 98 meshing with the smaller set of teeth 99 of a compound pinion 100 which is rigid with the pulley 101 rotating the magnetic powder-type control coupler 81. The larger set of teeth 102 of compound pinion 100 meshes with a pinion 103 having the same number of teeth as the set of teeth 102 and which is fixed to the pulley 104 driving the second magnetic powder-type control coupler 82. As the electric motor 84 rotates, the pulleys 101 and 104 rotate in opposite directions at the same speed. The output shafts of the control couplers 81 and 82 support pinions 105 and 106 having the same number of teeth and which mesh with a pinion 107 rigid with the copying head rotor 85. As long as no electric current flows through the induction coils of the control couplers 81 and 82, their output shafts, not being rigidly united with their drive pulleys, together wtih the rotor 85, will remain motionless. When the follower 4d recedes from the copying head axis X—X, the resulting movement of the core 94 of differential transformer 79 causes, through the agency of an electronic chain to be described hereinbelow, energization of the coil of the appropriate control coupler 81 or 82 which then has its drive pulley 101 (or 104) rigidly united with its output pinion 105 (or 106), thus transmittting the rotation of electric motor 84 to the rotor 85. The latter then fetches the projection of the pins 91 and 92 of swing-bar 90 onto the straight line Y and also fetches the core 94 of differential transformer 79 into its midway position, thereby cutting off the current to the field coil of the control coupler which was energized.

The systems described hereinabove embody a certain time constant and may even have a certain electrical remanence. As a result, the consecutive positions occupied by the rotor 85 impose upon the miller platen movements such that the profile of the workpiece or, what amounts to the same thing, the path 108 followed by the centre 5d of follower 4d, is not strictly identical with the theoretical path 109 (see FIG. 20), but assumes a sinusoid-like shape encompassing the theoretical profile. This is mitigated by means of the third magnetic powder-type coupler 83 (hereinafter referred to as the "retarding coupler") which is mounted within the copying head, as shown in FIG. 14. The pulley 110 of retarding coupler 83 is rigidly connected to the copying head casing 111 by means of a cup 112, and a pinion 113 mounted on the output shaft of retarding coupler 83 meshes with the teeth 107 of rotor 85. For the entire duration of the copying operation the field coil of retarding coupler 83 is supplied with 50-cycle alternating current and consequently locks with its pinion 113 one hundred times per second, making it rigid with its pulley 110 and thereby keeping the rotor 85 stationary and constraining whichever of control couplers 81 or 82 is energized to slip. In effect this is tantamount to modulating the operating threshold of control couplers 81 and 82, the ultimate effect of which is to machine a profile 114 that can be superimposed for all practical purposes upon the theoretical profile 109 (see FIG. 20).

A pinion 115 keyed to the upper end of the shaft of retarding coupler 83 meshes with the internal gear teeth of an externally knurled wheel 116 mounted on ball-bearings in the side 117 of casing 111. A segment of the wheel 116 protrudes from the casing 111 and, through the medium of pinions 115 and 113 and the teeth 107 of rotor 85, enables the straight line Y to be turned manually toward the profile to be copied in order to enable the approach operation to be performed.

As FIG. 21 schematically illustrates, the electronic control system required for operation of the electrical copying head according to the present invention basically comprises, in addition to the differential transformer 79 fed by an oscillator 118, a summation device 119 the function of which will be explained hereinafter, a modulated current amplifier for amplifying the signals emitted by the summation device 119, and a demodulator 121 which converts the modulated signals from amplifier 120 into D.C. signals of variable intensity and defines the polarity thereof. This chain is supplemented by a D.C. power amplifier 122 which transmits the amplified signals from demodulator 121 to the appropriate control coupler 81 or 82.

Compensation for the difference in diameter between the follower and the tool is obtained by means of a second differential transformer 123 the core 124 of which can be positioned as required within its winding by means of a conventional nut and screw system 125 controlled by the knob 126. The knob 126 bears a pointer 127 which moves before a scale 128 graduated in tenths of a millimetre, say from −2 to +2 millimetres, though a graduation in hundredths of a millimetre would by no means be incompatible with the precision of the system. By design, when the pointer 127 is opposite the zero-graduation of the scale 128, the core 124 of differential transformer 123 is positioned midway in its winding and no signal is applied to the summation device 119. Conversely, when the knob 126 is used to set up some given value on the scale 128, the core 124 assumes a different position in its winding and a signal of a value which is determined by this new position is applied to the summation device 119, which adds it algebraically to those which may have been emitted by the differential transformer 79. In effect, the above process can be likened to a situation wherein the origin of the winding of transformer 79 is modified and results in a complementary motion imparted to the rotor 85, bringing about, through the miller platen, a modification of the mutual positions of follower 4d and pattern 2d in the appropriate sense in order to compensate for half the difference between the follower and tool diameters, as set up on the scale 128. It is to be noted that the same system may be utilized for setting up the dimensional characteristics of a roughing pass.

The electric copying head described precedingly can be used to obtain a perfect finish by utilizing a grinding wheel as the cutting tool in the way described previously for the hydraulic copying head. The same degree of automaticity can be achieved in that case, in regard to a tool such as either a side-milling cutter or a grinding wheel, by providing the knob 126 with circumferential teeth and driving it through a system similar to that described with reference to FIG. 11.

As FIG. 22 schematically illustrates, such an installation may be comprised of a box 76 and a control console 78. The box 76 is mounted on the miller structure or in immediate proximity thereto and contains all the fully transistorized electrical gear described precedingly with the exception of differential transformer 123. The box is connected to the electric mains through a line 129 and to the copying head 73 and the control console 78 through lines 75 and 77 respectively. Preferably, the control console 78 is mounted on the miller structure adjacent the copying head 73 and encloses the differential transformer 123 and the control means thereof. Its control panel bears the scale 128 and the associated control knob 126 of differential transformer 123, pushbuttons automatically returned into their neutral positions, indicator lights which may or may not be incorporated in said pushbuttons, and a selector switch, the various functions of which are explained hereinbelow.

The pushbutton 130, called the approach pushbutton, bears thereon a preferably red indicator light 131 which remains lit so long as the follower 4d is not in contact with the pattern 2d. When the operative depresses pushbutton 130 the miller platen 1d moves a direction parallel with the straight line Y hereinbefore defined so long as said pushbutton is kept depressed, or until the follower 4d has come into contact with the pattern 2d. Once this approach has been effected the indicator light 131 goes out and the copying head is ready to begin copying.

The pushbutton 132, called the "start" pushbutton, bears thereon a preferably green indicator light 133 which lights up as soon as the electrical devices housed within box 76 are energized. Depressing this pushbutton 132 after the approach phase has been completed causes copying to begin and the indicator light 133 to go out.

When the pushbutton 134, called the "stop" bushbutton, is depressed, copying ceases and the indicator light 133 lights up once more.

The selector switch 135 is a two-position switch marked "Manual" and "Automatic." When this switch is in the "Manual" position and the approach phase has been performed through operation of pushbutton 130, initiation of the copying function requires depressing bushbutton 132. Conversely, when switch 135 is in the "Automatic" position, the copying function is initiated automatically as soon as the follower 4d has come into contact with the pattern 2d.

What we claim is:

1. A 360-degree copying method involving the use of a single follower in contacting engagement with a pattern to be reproduced with rotary cutting tools machining by their lateral surface and the diameters of which may differ from that of said follower within limits of plus or minus approximately two millimeters, said method comprising displacing the center of the follower relative to its theoretical position whereat the diameter of said follower is equal to that of the cutting tool, in a direction perpendicular to the tangent to the profile of the pattern at the corresponding theoretical copying point, toward or away from said point according to whether the tool is larger or smaller, respectively, than said follower, and limiting said displacement to an amount equal to half the difference between the actual diameters of said follower and of said cutting tool, the follower center being displaced with respect to its theoretical position by tilting said follower about a fixed point.

2. In a copying machine for continuously copying over 360 degrees a pattern displaceable by means of drive elements and of the type having a copying head with a follower to be set in a lateral contacting engagement with the pattern and a machining head with a rotary cutting tool which machines by its lateral surface a blank displaceable with said pattern in order to obtain a machined part the profile of which is identical to that of the pattern; the improvement comprising means mounted in the copying head for supporting the follower, means for modifying the position of the follower center relatively to its theoretical position through which the axis of the copying head passes, first means for servo-controlling said position modifying means by the mutual positions of the follower and the pattern, second means for servo-controlling the movements of the pattern and of the blank by the actual position of the follower center with respect to its theoretical position, and means connected to said second servo-controlling means, to said follower and to the cutting tool for compensating for differences in diameter between said follower and the cutting tool in the case of a tool the diameter of which differs from that of said follower by up to approximately 2 millimetres.

3. A copying machine according to claim 2, wherein the position modifying means comprises means for tilting the follower about a fixed point.

4. A copying machine according to claim 2, wherein the position modifying means comprises means for displacing the follower perpendicularly to its axis.

5. A copying head for continuously copying a pattern over 360 degrees and adaptable to a milling machine having a rotary cutting tool for machining by its lateral surface a blank and a platen supporting the pattern and the blank and which is movable in two mutually perpendicular directions by means of two drive motors comprising, in combination, a follower-holder, a follower carried by said follower-holder and to be set in lateral contacting engagement with the pattern to be reproduced on the blank, means mounted in the copying head for supporting said follower-holder and having a device for modifying the position of the follower center relatively to its theoretical position through which the axis of the copying head passes, first means for servo-controlling said position modifying device by the mutual position of the follower and the pattern, second means for servo-controlling the drive motors of the milling machine platen by the actual positions of the follower center with respect to its theoretical position, said second servo-controlling means being connected to said two drive motors, and means connected to said second servo-controlling means, to said follower and to the cutting tool for compensating for differences in diameter between said follower and the cutting tool in the case of a tool the diameter of which differs from that of said follower by up to approximately 2 millimetres.

6. A copying head according to claim 5, wherein the second servo-controlling means comprises means for generating from any deviation of the follower center from the copying head axis a control order to at least one of the two drive motors of the platen with a view to restore said center on said axis, provided that half the value of any possible difference between the diameters of the follower and the cutting tool has been preset on the copying head by the compensating means, whereby the pattern is maintained in constant contacting engagement with the follower and the blank is machined to the same size as the pattern.

7. A copying head for continuously copying a pattern over 360 degrees and adaptable to a milling machine having a rotary cutting tool for machining by its lateral surface a blank and a platen supporting the pattern and the blank and which is movable in two mutually perpendicular directions by means of two drive motors, comprising, in combination, a follower-holder, a follower carried by said follower-holder and to be set in lateral contacting engagement with the pattern to be reproduced on the blank, means mounted in the copying head for supporting said follower-holder and having a device for modifying the position of the follower center relatively to its theoretical position through which the axis of the copying head passes, first means for servo-controlling said position modifying device by the mutual positions of the follower and the pattern, second means for servo-controlling the drive motors of the milling machine platen by the actual position of the follower center with respect to its theoretical position, means connected to said second servo-controlling means, to said follower and to the cutting tool for compensating for differences in diameter between said follower and the cutting tool in the case of a tool the diameter of which differs from that of said follower by up to approximately 2 millimetres, a rotor centered upon the copying head axis and rigidly connected to said follower-holder, means for rotating said rotor in one direction or the other and controlled by said follower-holder through said second servo-controlling means, feed means to said two drive motors, and cams carried by said rotor for actuating said feed means.

8. A hydraulically controlled copying head for continuously copying a pattern over 360 degrees and adaptable to a milling machine having a rotary cutting tool for machining by its lateral surface a blank and a platen supporting the pattern and the blank and which is movable in two mutually perpendicular directions by means of two drive motors, comprising, in combination, a body fixedly mounted on the milling machine, a ball-joint mounted in said body and centered upon the copying head axis, a hollow follower-holder passing diametrically through said ball-joint for penetrating within said body, a follower carried by the part of said follower-holder disposed on the outside of said body and to be set in lateral contacting engagement with the pattern, a hydraulic motor housed in said body and having a rotor coaxial with the copying head axis and formed with an arm directed towards said ball-joint and ending through a slideway having a diametrical centerplane, a device carried by the penetrating part of said follower-holder, coaxial therewith and movable within said slideway, a pusher pivotally mounted on said arm perpendicularly to said diametrical plane, a fluid distributing slide-valve for said motor, centered upon said copying head axis and having a slide provided with a 45-degree bevel thereon, a spring for urging said slide towards said pusher, means carried by said pusher and in contacting engagement with said bevel and at two points 120 degrees apart with the inner wall of said follower-holder, respectively, a lever pivotally and resiliently mounted on said rotor parallelly to said copying head axis, means carried by said lever and in contacting engagement with the inner wall of said follower-holder at a point spaced 120 degrees apart from the bearing points of the contacting means carried by said pusher, the three bearing points on said inner wall being disposed in a common plane at right angles to the copying head axis, feed means housed within said body and connected to the two drive motors of the milling machine platen, cams carried by said rotor for actuating said feed means, means connected to said fluid distributing slide-valve and to said spring for generating a bodily movement of said slide-valve and of said spring along the copying head axis without modifying the relative positions thereof, means for controlling said bodily movement generating means so that said movement is equal to the difference in radius between the follower and the cutting tool for a tool the radius of which differs from that of said follower by up to approximately 1 millimetre, and means for locking the slide-valve and the spring against the action of said controlling means.

9. A copying head according to claim 8, wherein the contacting means carried by the pusher and the lever consist of anti-friction bearings.

10. A copying head according to claim 9, wherein the distances of the ball-joint center from the contact point of the anti-friction bearing carried by the pusher with the bevel on the slide and from the center of the follower are equal.

11. A copying head according to claim 8, wherein a very slight leakage flow is provided around the slide.

12. A copying head according to claim 8, wherein the centerplane of the slideway is slightly offset with respect to the copying head axis in order to slightly offset the follower center forward of its theoretical position through which said axis passes.

13. A copying head according to claim 8, wherein the slide is reciprocally movable within a cylindrical body projecting from the copying head body, formed on said projection with a screw-thread and slidable in said copying head body, wherein the copying head body has an outer mark on its part close to said cylindrical body projection, and wherein the bodily movement generating means, the means for controlling said movement and the locking means comprise a nut engaging said screw-thread, a handwheel rigidly connected to said nut and provided with a scale of possible offset values graduated in differences in radius between the follower and the cutting tool, a rotatable milled knob coaxial with said copying head axis, means for connecting in translation said knob with said cylindrical body, and a nut and screw system connecting said knob with said spring, the zero graduation of said scale being opposite said mark when the follower is in its theoretical position through which the copying head axis passes, whereby the position of the follower center can be adjusted in relation to any radius difference by manually operating said handwheel.

14. A copying head according to claim 13, further comprising electrical means for measuring the variation in the diameter of the cutting tool, an integrator electrically connected to said electrical measuring means, an electrical driving means connected to said integrator, and a transmission interconnecting said driving means and the handwheel for angularly displacing said handwheel to fetch opposite the mark the graduation of the scale corresponding to half the difference between the diameters of the follower and of said cutting tool, whereby the position of the follower center can be automatically adjusted.

15. A copying head according to claim 8, wherein the feed means for the platen drive motors are enclosed in a removable unit screwed to the copying head body, thereby enabling the copying head to be very quickly adapted to the milling machine for which it is intended.

16. A copying head according to claim 8, wherein the cutting tool is a grinding wheel.

17. An electrically controlled copying head for continuously copying a pattern over 360 degrees and adaptable to a milling machine having a rotary cutting tool for machining by its lateral surface a blank and a platen supporting the pattern and the blank and which is movable in two mutually perpendicular directions by means of two drive motors, comprising, in combination, a body fixedly mounted on the milling machine, a hollow follower-holder pentrating within said body and parallel to the copying head axis, a follower carried by said follower-holder to be set in lateral contacting engagement with the pattern, a hollow rotor coaxial with the copying head, a swing-bar on which said follower-holder is fixed and which passes through said hollow-rotor and is pivotally mounted on said rotor about an axis parallel with the copying head axis, two control powder-type magnetic couplers housed within said body and respectively having input pulleys, an electric motor coaxially mounted on said body opposite said follower-holder and rotating at uniform speed in the same direction, a first transmission means interconnecting said input pulleys and said electric motor for driving said input pulleys in opposite directions, a second transmission means interconnecting said control couplers and said rotor, a spring one end of which is fixed on said rotor and which is connected to said swing-bar for urging said bar away from the copying head axis, a differential transformer carried by said rotor and having a core one end of which is connected to the free end of said spring, a countering spring one end of which is fixed on said rotor while its free end is connected to the other end of said core, means for energizing said differential transformer, an electronic chain interconnecting said differential transformer and said control couplers for controlling said couplers by the signals emitted by said differential transformer, means connected to said control couplers for modulating their operating threshold, means for measuring the variation in the diameter of the cutting tool, means connected to said measuring means for introducing an initial shift into said electronic chain as a function of the difference in diameter between the follower and the cutting tool for a tool the diameter of which differs from that of said follower by up to approximately 2 millimetres, feed means housed within said body and connected to the two drive motors of the milling machine platen, and cams carried by said rotor for actuating said feed means.

18. A copying head according to claim 17, wherein the follower center is offset forward of its theoretical position through which the copying head axis passes and has its projection lying on the straight line which passes through the swing-bar axis and extends parallel to the tangent to the profile at the copying point, this offset being preselectable as a function of the desired copying rate and stability by merely replacing the follower-holder.

19. A copying head according to claim 17, wherein the modulation means comprises a retarding powder-type coupler having an input shaft and an input pulley rigidly united with the copying head body, a third transmission means interconnecting said retarding coupler and the rotor, and means for continuously supplying said retarding coupler with alternating current during the copying operation.

20. A copying head according to claim 19, further comprising a wheel protruding from the copying head body and a transmission interconnecting said wheel and the input shaft of said retarding coupler whereby to allow the orientation of the straight line which passes through the swing-bar pivotal axis and lies parallel with the tangent to the profile at the copying point, and thereby permit execution of the approach phase.

21. A copying head according to claim 19, wherein the energizing means and the electronic chain comprise an oscillator for feeding the differential amplifier, and, connected in series with said differential amplifier, a summation device connected to the means for introducing the initial shift, a modulated current amplifier, a demodulator and a direct-current power amplifier connected to the control and retarding couplers.

22. A copying head according to claim 21, wherein the means for measuring the variation in the diamter of the cutting tool comprises, a feeler in contacting engagement with the tool, an electronic device connected to said feeler and sensitive to the feeler displacements, an integrator connected to said electronic device, an electrical driving means connected to said integrator, a rotatable knob having a pointer, a transmission interconnecting said knob and said electrical driving means, and a fixed scale of possible offset values graduated in differences in radius between the follower and the cutting tool, the zero graduation of said scale being opposite said pointer when the follower is in its theoretical position through which the copying head axis passes.

23. A copying head according to claim 22, wherein the means for introducing an initial shift in the electronic chain comprises a second differential transformer connected to the oscillator and to the summation device and having a core, and a nut and screw system interconnecting said core and the rotatable knob.

24. A copying head according to claim 17, wherein the feed means for the platen drive motors are enclosed in a removable unit screwed to the copying head body, thereby enabling the copying head to be very quickly adapted to the milling machine for which it is intended.

25. A copying head according to claim 20, wherein the cutting tool is a grinding wheel.

References Cited by the Examiner
UNITED STATES PATENTS 2,899,868  8/1959  Glaser _____ 90—62 X WILLIAM W. DYER, JR., *Primary Examiner.*

G. A. DOST, *Assistant Examiner.*